United States Patent
Jin (10) Patent No.: US 10,812,966 B2
(45) Date of Patent: Oct. 20, 2020

(54) METHOD OF CONFIGURING PARAMETERS FOR A BASE STATION

(71) Applicant: HUAWEI TECHNOLOGIES CO.,LTD., Shenzhen, Guangdong (CN)

(72) Inventor: Weisheng Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/693,498

(22) Filed: Sep. 1, 2017

(65) Prior Publication Data

US 2018/0063701 A1 Mar. 1, 2018

Related U.S. Application Data

(60) Provisional application No. 62/382,291, filed on Sep. 1, 2016.

(51) Int. Cl.
| | |
|---|---|
| H04W 24/02 | (2009.01) |
| H04W 8/22 | (2009.01) |
| H04W 24/10 | (2009.01) |
| H04W 88/08 | (2009.01) |

(52) U.S. Cl.
CPC ............ *H04W 8/22* (2013.01); *H04W 24/02* (2013.01); *H04W 24/10* (2013.01); *H04W 88/08* (2013.01)

(58) Field of Classification Search
CPC ....... H04W 8/22; H04W 24/02; H04W 24/10; H04W 88/08; H04W 60/00
See application file for complete search history.

(56) References Cited

U.S. PATENT DOCUMENTS

| | | | | |
|---|---|---|---|---|
| 9,629,041 | B1 * | 4/2017 | Oroskar | H04W 24/02 |
| 2007/0258402 | A1 * | 11/2007 | Nakamata | H04W 72/06 |
| | | | | 370/329 |
| 2010/0220687 | A1 * | 9/2010 | Reznik | H04W 36/005 |
| | | | | 370/331 |
| 2010/0246482 | A1 * | 9/2010 | Erceg | H04W 16/28 |
| | | | | 370/328 |

(Continued)

FOREIGN PATENT DOCUMENTS

| | | |
|---|---|---|
| CN | 101291527 A | 10/2008 |
| CN | 101808322 A | 8/2010 |
| CN | 101815256 A | 8/2010 |

(Continued)

OTHER PUBLICATIONS

Machine Translation and Abstract of Chinese Publication No. CN101291527, Oct. 22, 2008, 16 pages.

(Continued)

*Primary Examiner* — Chuong A Ngo
(74) *Attorney, Agent, or Firm* — Conley Rose, P.C.

(57) ABSTRACT

The application provides a method, apparatus and system of configuring parameters for a base station. A network controller receives a registration request from a newly added base station. The network controller obtains wireless configuration parameters for the base station, and sends the wireless configuration parameters to the base station. The wireless configuration parameters are broadcasted by the base station to one or more terminal equipments, and are used by a terminal equipment when it sends a connection request to the base station.

23 Claims, 7 Drawing Sheets

(56) References Cited

U.S. PATENT DOCUMENTS

| | | | | |
|---|---|---|---|---|
| 2012/0172040 A1* | 7/2012 | Xu | ............... | H04W 12/06 |
| | | | | 455/435.1 |
| 2016/0037541 A1* | 2/2016 | Kim | ............... | H04B 7/0626 |
| | | | | 370/329 |

FOREIGN PATENT DOCUMENTS

| | | |
|---|---|---|
| CN | 102740300 A | 10/2012 |
| EP | 2127415 B1 | 6/2014 |
| WO | 2011023234 A1 | 3/2011 |

OTHER PUBLICATIONS

Machine Translation and Abstract of Chinese Publication No. CN101808322, Aug. 18, 2010, 19 pages.

"3rd Generation Partnership Project; Technical Specification Group Services and System Aspects; Vocabulary for 3GPP Specifications (Release 13)," 3GPP TR 21.905 V13.1.0, Jun. 2016, 66 pages.

"3rd Generation Partnership Project; Technical Specification Group Services and System Aspects; General Packet Radio Service (GPRS) enhancements for Evolved Universal Terrestrial Radio Access Network (E-UTRAN) access Release 14)," 3GPP TS 23.401 V14.0.0, Jun. 2016, 374 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.4.0, Jun. 2016, 310 pages.

"3rd Generation Partnership Project; Technical Specification Group Radio Access Network; Evolved Universal Terrestrial Radio Access Network (E-UTRAN); S1 Application Protocol (S1AP) (Release 13)," 3GPP TS 36.413 V13.3.0, Jun. 2016, 331 pages.

Neul, "CR for mf2016.100.02: MF-AP Parameters Configuration," MFA—TSG meeting #6, mf2016-331.01, Sep. 6-9, 2016, 2 pages.

Neul, "CR for mf2016.100.02: Neighbour Relation Table Configuration," MFA—TSG meeting #6, mf2016.331.01, Sep. 6-9, 2016, 2 pages.

Neul, "CR for mf2016.100.02: NHN-ID and NHN-Name Configuration," MFA—TSG meeting #6, mf2016.331.01, Sep. 6-9, 2016, 2 pages.

Foreign Communication From a Counterpart Application, PCT Application No. PCT/CN2017/100194, English Translation of International Search Report dated Oct. 26, 2017, 7 pages.

Foreign Communication From a Counterpart Application, PCT Application No. PCT/CN2017/100194, English Translation of Written Opinion dated Oct. 26, 2017, 4 pages.

3rd Generation Partnership Project; Technical Specification Group Services and System Aspects; Telecommunication Management; Management Level Procedures and Interaction with UTRAN (Release 5), 3GPP TR 32.800, V5.0.0, Mar. 2002, 37 pages.

"3rd Generation Partnership Project; Technical Specification Group Radio Access Network; UTRAN Iub interface Node B Application Part (NBAP) signalling (Release 13)," 3GPP TS 25A33, V13.3.0, Jun. 2016, 1386 pages.

Foreign Communication From a Counterpart Application, European Application No. 17845549.9, Extended European Search Report dated Jun. 25, 2019, 13 pages.

Machine Translation and Abstract of Chinese Publication No. CN101815256, Aug. 25, 2010, 28 pages.

Machine Translation and Abstract of Chinese Publication No. CN102740300, Oct. 17, 2012, 30 pages.

Foreign Communication From a Counterpart Application, Chinese Application No. 201780067817.2, Chinese Office Action dated Feb. 3, 2020, 10 pages.

Foreign Communication From a Counterpart Application, Chinese Application No. 201780067817.2, Chinese Search Report dated Jan. 19, 2020, 4 pages.

* cited by examiner

METHOD OF CONFIGURING PARAMETERS FOR A BASE STATION

CROSS REFERENCE TO RELATED APPLICATION

This application claims priority to U.S. provisional application No. 62/382,291, filed on Sep. 1, 2016, the disclosure of which is hereby incorporated by reference in its entirety.

TECHNICAL FIELD

The present application relates to the field of communication technologies, and in particular, to configuring parameters for a base station.

BACKGROUND

According to Third Generation Partnership Project (3GPP) standards, a communication system has operation, administration and maintenance (OAM) mechanisms. For example, in a long-term evolution (LTE) system under the 3GPP standards, before an evolved NodeB (eNB) registers to the LTE system, parameters need to be configured for the eNB by a dedicated network management element. Then the eNB reports the parameters configured by the dedicated network management element to a mobility management entity (MME), to which the eNB connects during a registering process.

However, in a network that is under development (for example, a MulteFire network, which is a form of LTE deployment in unlicensed frequency bands), the OAM mechanisms may not be fully defined as they are in the LTE system. Also, for the simplification of the future network deployment, a dedicated network management element may not be equipped in some networks. If this is the case, then a base station (or the equivalent) in such a network may need to use a different manner to obtain the parameters configured for it before registering to the network.

SUMMARY

It is an object of the application to provide a method, apparatus and system of configuring parameters for a base station.

In a first aspect, a method of configuring parameters for a base station is provided. The method comprises: receiving, by a network controller, a registration request from a newly added base station; obtaining, by the network controller, wireless configuration parameters for the base station; sending, by the network controller, the wireless configuration parameters of the base station to the base station; and receiving, by the network controller, a connection request from a terminal equipment via the base station according to the wireless configuration parameters of the base station.

The wireless configuration parameters comprise at least one of the following:
a network identifier (ID) of a network that the network controller belongs to,
a network name of the network,
a base station ID of the base station that the network controller configured for the base station,
a base station cell ID of a cell that the network controller configured for the base station,
a tracking location ID of the base station that the network controller configured for the base station, and
a neighbor relation table (NRT) comprising information of one or more neighbor cells of the cell configured for the base station.

In some implementations, obtaining the wireless configuration parameters for the base station comprises at least one of the following steps: delivering, by the network controller, the network ID or the network name to the base station, wherein the network ID or the network name are configured by a manufacturer or a network operator; and allocating, by the network controller, the base station ID, the base station cell ID or the tracking location ID according to preset value scopes of base station ID, base station cell ID, or tracking location ID configured by the manufacturer or the network operator.

In some implementations, the method further comprises: obtaining, by the network controller, a signal measurement report of one or more neighbor cells from the base station, wherein for a neighbor cell, the signal measurement report comprises at least one of the following parameters: a network ID, a network name, a base station ID of a base station that serves the neighbor cell, a base station cell ID of the neighbor cell, a tracking location ID of the neighbor cell, and a signal strength; and obtaining the wireless configuration parameters for the base station comprises: allocating, by the network controller, the tracking location ID according to the signal measurement report; or creating, by the network controller, the NRT according to the signal measurement report.

In some implementations, the method further comprises: updating, by the network controller, the NRT when another base station is added; and sending, by the network controller, the updated NRT to the base station.

In some implementations, the network controller is a mobility management function in a mobility management entity (MME), and the base station is an evolved Node (eNB).

In some implementations, the network controller is an access and mobility management function (AMF), and the base station is an access network (AN) entity.

In some implementations, the network controller is a mobility management function in a neutral host-mobility management entity (NH-MME), and the base station is a MulteFire-Access point (MF-AP).

In a second aspect, a method of configuring parameters for a base station is provided. The method comprises: sending, by a first base station, a registration request message to a network controller; receiving, by the base station, wireless configuration parameters from the network controller; broadcasting, by the base station, the wireless configuration parameters to one or more terminal equipment.

In some implementations, the method further comprises: receiving, by the base station, a connection request sent by a terminal equipment according to the broadcasted wireless configuration parameters; sending, by the base station, the connection request from the terminal equipment to the network controller.

In some implementations, the wireless configuration parameters comprise at least one of the following:
a network identifier (ID) of a network that the network controller belongs to,
a network name of the network,
a base station ID of the base station that the network controller configured for the base station,
a base station cell ID of a cell that the network controller configured for the base station,
a tracking location ID of the base station that the network controller configured for the base station, and a Neighbor Relation Table (NRT) comprising information of one or more neighbor cells of the cell configured for the base station.

In some implementations, the method further comprises: performing, by the base station, measurement of one or more neighbor cells to obtain a signal measurement report of the one or more neighbor cells; and sending, by the base station, the signal measurement report to the network controller, wherein, for a neighbor cell, the measurement report comprises at least one of the following parameters: a network ID, a network name, a base station ID of a base station that serves the neighbor cell, a base station cell ID of the neighbor cell, a tracking location ID of the neighbor cell, and a signal strength.

In some implementations, the tracking location ID is allocated by the network controller according to the signal measurement report, or the NRT is created by the network controller according to the signal measurement report.

In some implementations, the method further comprises: receiving, by the base station, an updated NRT from the network controller when another base station is added to the network.

In some implementations, the network controller is a mobility management function in a mobility management entity (MME), and the base station is an evolved Node (eNB).

In some implementations, the network controller is an access and mobility management function (AMF), and the base station is an access network (AN) entity.

In some implementations, the network controller is a mobility management function in a neutral host-mobility management entity (NH-MME), and the base station is a MulteFire-Access point (MF-AP).

In a third aspect, a network controller apparatus is provided. The network controller apparatus has a function of implementing the behavior of the network controller in the example of the method described above. The functions may be implemented in hardware, or may be implemented by software. The hardware or software includes one or more modules corresponding to the functions described above.

In some implementations, the structure of the network controller apparatus includes a receiving unit, a processing unit and a sending unit. The processing unit supports the network controller apparatus to perform a corresponding function in the method described above. The receiving unit and sending unit supports communication between the network controller apparatus and other devices. The network controller apparatus may also include a memory storing program code and data for the apparatus. As an example, the processing unit may be a processor, the receiving unit and may be a receiver, and the sending unit may be a sender.

In a forth aspect, a base station apparatus is provided. The base station apparatus has a function of implementing the behavior of the base station in the example of the method described above. The functions may be implemented in hardware, or may be implemented by software. The hardware or software includes one or more modules corresponding to the functions described above.

In some implementations, the structure of the base station apparatus includes a receiving unit, a processing unit and a sending unit. The processing unit supports the base station apparatus to perform a corresponding function in the method described above. The receiving unit and sending unit supports communication between the base station apparatus and other devices. The base station apparatus may also include a memory storing program code and data for the apparatus.

As an example, the processing unit may be a processor, the receiving unit and may be a receiver, and the sending unit may be a sender.

In a fifth aspect, a communication system is provided by comprising a network controller of the third aspect, and the base station of the forth aspect. In some implementations, the system may also include other devices provided by the embodiments of the application that interact with the network controller or the base station.

In a sixth aspect, an embodiment of the present application provides a computer-readable storage medium for storing computer software instructions for the above network controller, comprising a program for performing the aspects described above.

In a seventh aspect, an embodiment of the present application provides a computer-readable storage medium for storing computer software instructions for the above base station, comprising a program for performing the aspects described above.

In a eighth aspect, the present application also provides a computer program product containing instructions that, when run on a computer, cause a computer to perform the methods described in the above aspects.

In a ninth aspect, the present application provides a chip system comprising a processor for supporting a network controller or a base station to implement the functions described in the above aspects, for example, receiving or processing the data or information involved in the method described above. In some implementations, the chip system further comprises a memory for storing program instructions and data necessary for the network controller or the base station. The chip system can include chips; can also include chips and other discrete devices.

According to the method of configuring parameters for a base station provided by this application, when a base station registers with a network controller, the network controller configures the wireless configuration parameters for the base station. Thus the base station can registers to the network successfully in a network without OAM mechanisms.

Other systems, methods, features, and advantages of the present application will be or become apparent to one with skill in the art upon examination of the following drawings and detailed description. It is intended that all such additional systems, methods, features, and advantages be included within this description, be within the scope of the present application, and be protected by the accompanying claims.

BRIEF DESCRIPTION OF THE DRAWINGS

A further understanding of the nature and advantage of the present application may be realized by reference to the following drawings, in which.

DETAILED DESCRIPTION

It should be understood at the outset that although an illustrative implementation of one or more embodiments are provided below, the disclosed systems and/or methods may be implemented using any number of techniques, whether currently unknown or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

Furthermore, it is to be understood that following steps are not limited to serial execution, but rather, any number of threads, processes, services, servers, and/or the like that may execute asynchronously, concurrently, in parallel, simultaneously, synchronously, and/or the like are contemplated by the disclosure. As such, some of these steps may be mutually contradictory, in that they cannot be simultaneously present in a single embodiment. Similarly, some steps are applicable to one aspect of the application, and inapplicable to others.

Figure 1:
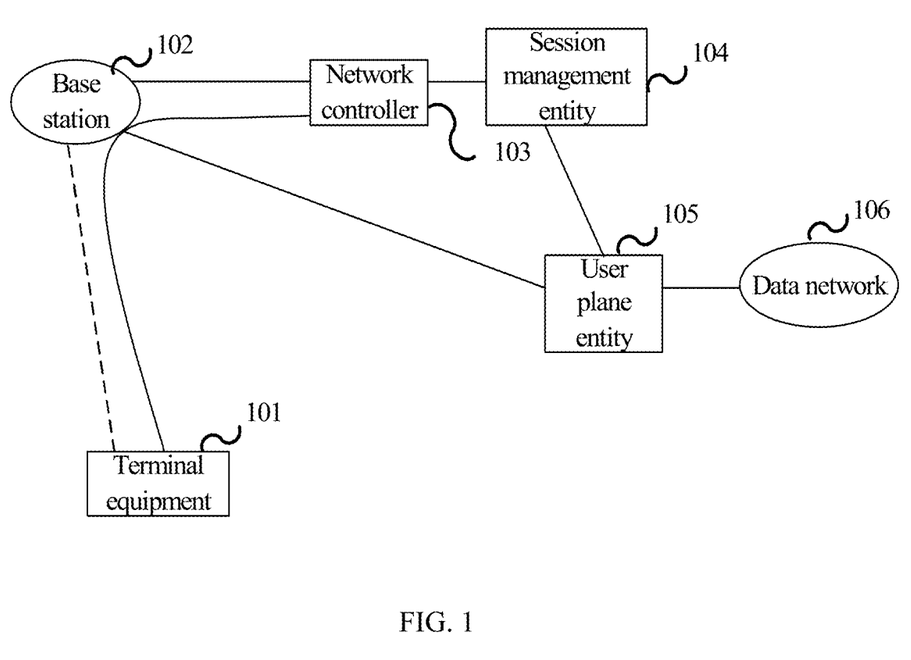
FIG. 1 is a simplified block diagram of a communication system in which a parameter and information configuration process in accordance with an embodiment of the application is implemented.

FIG. 1 illustrates a simplified block diagram of a telecommunication network architecture according to an existing understand or a developing standard. In such a system, the technical solutions according to the embodiments of the application may be implemented. As shown in FIG. 1, an access network includes one or more base stations 102, one or more network controllers 103, one or more session management entities 104, and one or more user plane entities 105. The access network connects to a data network 106, and enables multiple terminal equipments 101 to be connected with the data network 106.

The terminal equipment 101 may be a device with wired or wireless transceiver functions that can be deployed on land, either indoors or outdoors, on the water or in the air. The terminal equipment 101 may be a user equipment (UE), a mobile telephone, a tablet or portable computer with wireless transceiver functions, a virtual reality (VR) terminal, an augmented reality (AR) terminal, an industrial control device, a wireless terminal equipment in a self-drive vehicle, a wireless terminal equipment in a remote medical equipment, and so on.

The base station 102 is also known as a radio access network (RAN) entity. The base station transmits information between terminal equipment 101 and the access network. For example, the base station 102 may be an eNB in a LTE system, an access network (AN) in a fifth generation (5G) communication system, or a MulteFire-Access point (MF-AP) in a MulteFire network, and so on.

The network controller 103 is responsible for mobility management of the terminal equipment. The network controller 103 may be a mobility management function in a mobility management entity (MME) in a LIE system, an access and mobility management function (AMF) in a 5G communication system, or a mobility management function in a neutral host-mobility management entity (NH-MME) in a MulteFire network, and so on.

The session management entity 104 is responsible for session management, such as session establishment. The session management entity 104 may be a session management function in a MME in the LTE system, a session management function (SMF) in the 5G system, or a session management function in a NH-MME in a MulteFire network, and so on.

The user plane entity 105 is responsible for connecting to an external network. The user plane entity 105 may be a serving gateway (SGW) and a packet data network gateway (PGW) in the LTE system, a user plane function (UPF) in the 5G system, or a neutral host-gateway (NH-GW) in a MulteFire network, and so on.

The data network 106 is responsible for providing data services for the terminal equipment 101.

There are some parameters that need to be obtained from the access network and configured for a base station when the base station starts to work as a part of the access network. The parameters include at least one of the following but not limited to:

a network identifier (ID) of the access network, a network name of the access network, a base station ID that is configured by the access network, a base station cell ID that is configured by the access network, a tracking location ID of a tracking area or a routing area of the base station, and a neighbor relation table (NRT) including information of neighbor cells.

The network ID is an identifier of the network accessible via the base station. The network ID is advertised in broadcast channels. The network ID may be an identifier of a local home network in the LTE system, an identifier of a local area network in 5G system, or a Neutral Host Network Identifier (NHN-ID) in a MulteFire network, and so on.

The network name is a name of the network. The network name may be a Neutral Host Network Name (NHN-Name), and so on.

The base station ID is an identifier of the base station. The base station ID may be an eNB ID in LTE system, a 5G-AN ID in 5G system, or a MulteFire-Acess Point (MF-AP) ID in MulteFire Network, and so on.

The base station cell ID is an identifier of a cell the base station serves. The base station cell ID may be an E-UTRAN Cell Global Identifier (ECGI) in LTE system, a 5G cell identifier in 5G system, or a cell identifier of MF-AP in MulteFire Network, and so on.

The tracking location ID is an identifier of an area for location management, such as a tracking area, a routing area. The tracking location ID may be Tracking Area Identity (TAI), Routing Area Identity (RAI), Tracking Area code (TAC) or Routing Area code (RAC), and so on. The TAI/RAI may be PLMN ID plus TAC/RAC, Neutral Host Access Mode Indicator (NHAMI) plus TAC/RAC, and so on. The NRT is a table that contains the information about the neighbor relations between a cell and its neighbor cells.

Figure 2:
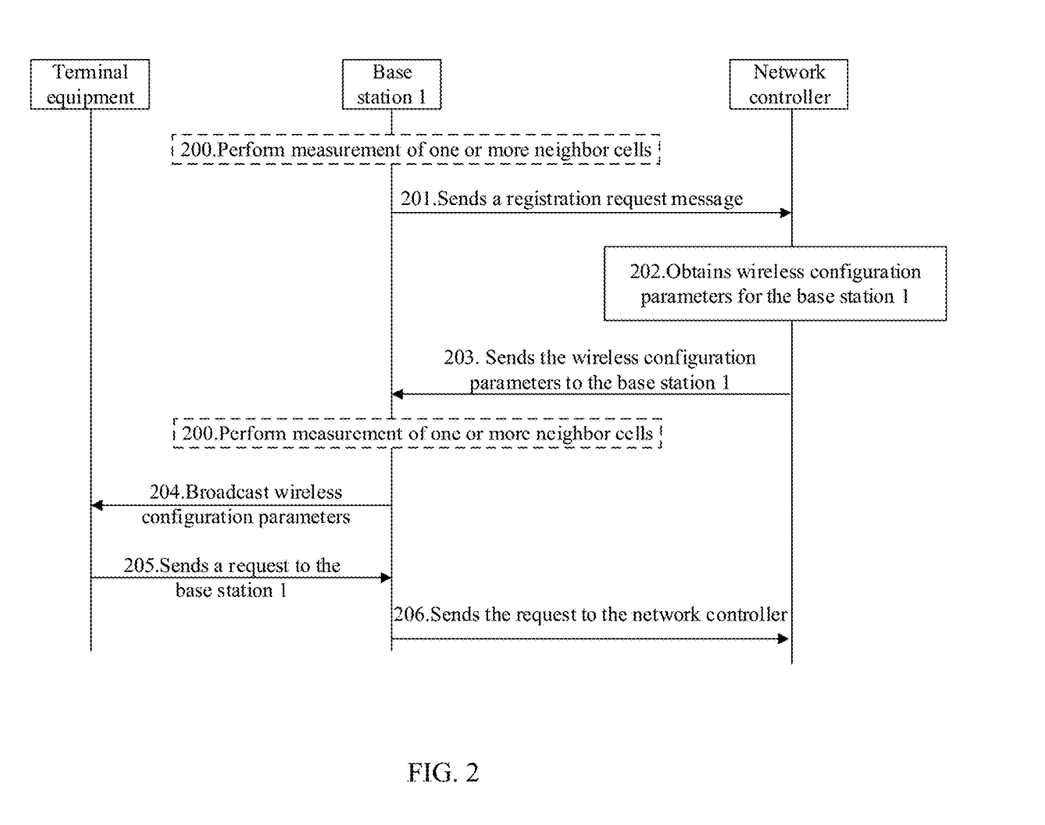
FIG. 2 is a general flowchart of a method for configuring parameters.

FIG. 2 is a general flowchart of a method of configuring parameters for a base station. The method includes the following steps:

Step 201. A base station 1 sends a registration request to a network controller.

The registration request informs the network controller a new base station needs to register to the network and to start to work. The registration request is a parameter configuration request. For example, the registration request may be an S1 setup request.

In one instance, the method may additionally includes a step 200: the base station 1 performs measurement of one or more neighbor cells around the base station 1. For example, neighbor cells 1 and 2 are served by a base station 2, and neighbor cell 4 is served by a base station 3. Through the measurement, the base station obtains one or more of the following parameters of the network and one of the neighbor cells:

a network ID,
a network name,
a base station ID of a base station that serves the neighbor cell,
a base station cell ID of the neighbor cell,
a tracking location ID of the neighbor cell, and
a signal strength of the neighbor cell.

Therefore, if the base station 1 performs step 200 before step 201, the registration request sent by the base station 1 in step 201 may further include a signal measurement report of the one or more neighbor cells. The signal measurement report may include parameters of the network and one or more of the neighbor cells, such as:

a network ID,
a network name,
a base station ID of a base station that serves a neighbor cell,
a base station cell ID of the neighbor cell,
a tracking location ID of the neighbor cell, and
a signal strength.

Also, the step 200 can be performed after step 201, as described in the following.

For example, a signal measurement report may be in a tabular form, as shown in the following Table 1.

TABLE 1

An example of a signal measurement report

| Network ID | Network name | Base station ID | Base station cell ID | Tracking location ID | Signal strength |
| --- | --- | --- | --- | --- | --- |
| network 1 | network name 1 | base station 2 | cell 1 | tracking location 1 | −20 dBm |
| network 1 | network name 1 | base station 2 | cell 2 | tracking location 2 | −80 dBm |
| network 1 | network name 1 | base station 3 | cell 4 | tracking location 3 | −120 dBm |

Step 202. The network controller obtains parameters for the base station 1.

The parameters include at least one of the following: a network ID, a network name, a base station ID, a base station cell ID, a tracking location ID, and a NRT.

In one instance, the network ID, or the network name is configured by a manufacturer or a network operator. The network operator may be a 3GPP network operator, a NHN operator, a network owner, or any other possible network operators.

In one instance, the base station ID or the base station cell ID is allocated by the network controller according to a value scope provided by the manufacturer of the base station or the network operator. For example, the manufacturer configures a maximum value scope of base station IDs or base station cell IDs, and the network operator may configure an applicable value scope of base station IDs or base station cell IDs while setting up the network controller in the network. The applicable value scope of base station IDs or base station cell IDs is within the maximum value scope of base station IDs or base station cell IDs. The network controller allocates a base station ID or a base station cell ID to the base station when it starts to work as part of the network according to the applicable value scope of base station IDs or base station cell IDs.

In one instance, the tracking location ID is allocated by the network controller according to a value scope provided by the manufacturer or the operator, or according to the signal measurement report. For example, (1) the network controller allocates a unique tracking location ID in the network to the base station 1, so that one base station supports one tracking location ID; or (2) when the request from the base station 1 includes the signal measurement report, the network controller selects one tracking location ID supported by the nearest (according to the signal strength) base station (e.g. base station 2) according to the signal measurement report as the base station 1.

In one instance, when the request from the base station 1 includes the signal measurement report, the network controller creates an NRT according to the signal measurement report. For example, the network controller knows which base stations are already registered (e.g. base station 2) and are near the newly registering base station 1 according to the signal measurement report. The network controller adds the cell(s) of the base station(s) into the NRT.

Step 203. The network controller sends a reply message, which includes one or more of the network ID, network name and parameters configured for the base station, to the base station 1.

In one instance, the network controller sends a S1 setup response, and the S1 Setup response includes one or more of the above parameters.

Alternatively, the base station 1 may perform the step 200 after step 203 to obtain the signal measurement report of one or more neighbor cells. Since the base station 1 has already obtained the network ID or the network name in step 203, the base station 1 may send a signal measurement report of one or more neighbor cells which belong to the same network as base station 1 (e.g. neighbor cells have same network ID or same network name as the network ID or the network name that base station 1 has already received in step 203). Then the network controller allocates the tracking location ID, or creates an NRT according to the signal measurement report (the details of which can be referred to the above description with regard to the step 202), and sends the tracking location ID, or the NRT to the base station 1 (for example, carried in a configuration update message).

Optionally, after step 203, while a new base station 3 performs registration to the network controller, the network controller updates the NRT of the base station 1, and the network controller sends the updated NRT to the base station 1, for example, in a configuration update message.

Step 204: The base station 1 broadcasts the configured parameters to terminal equipments.

After performing the above steps, the base station 1 starts to work as part of the network and is ready for connecting to the terminal equipments. If any terminal equipment needs to access the network, the following steps are performed.

Step 205: A terminal equipment selects the base station 1, and sends a connection request to the base station 1. The connection request may be carried in a radio resource control (RRC) message to the base station 1.

In one instance, the terminal equipment may initiate an attach procedure, a Tracking Area Update procedures or a handover procedure for connecting to the base station 1 in a LTE system.

In one instance, the terminal equipment may initiate a registration procedure or a handover procedure for connecting to the base station 1 in a 5G system.

Step 206: The base station 1, in response to the connection request from the terminal equipment, sends a connection request to the network controller.

In one instance, in the LTE system, the connection request may be carried in a INITIAL UE MESSAGE sent by the base station 1 to the network controller in the attach procedure or the Tracking Area Update procedure, or the connection request may be carried in a UPLINK NAS TRANSPORT sent by the base station 1 to the network controller in the Tracking Area Update procedure, or the connection request may be carried in a PATH SWITCH REQUEST sent by the base station 1 to the network controller in the handover procedure. The INITIAL UE MESSAGE, UPLINK NAS TRANSPORT or PATH SWITCH REQUEST includes the tracking location ID and the base station cell ID.

In one instance, in the 5G system, the connection request may be carried in a N2 message sent by the base station 1 to the network controller in the registration procedure, or the connection request may be carried in a N2 Path Switch Request message in the handover procedure. The N2 message or the N2 Path Switch Request message includes the tracking location ID and the base station cell ID.

Therefore, according to this general method of configuring parameters for a base station, when a base station registers with an access network, a network controller configures one or more parameters for the base station. Thus the base station can registers to the network successfully, even in a network that does not have the OAM mechanisms.

Figure 3:
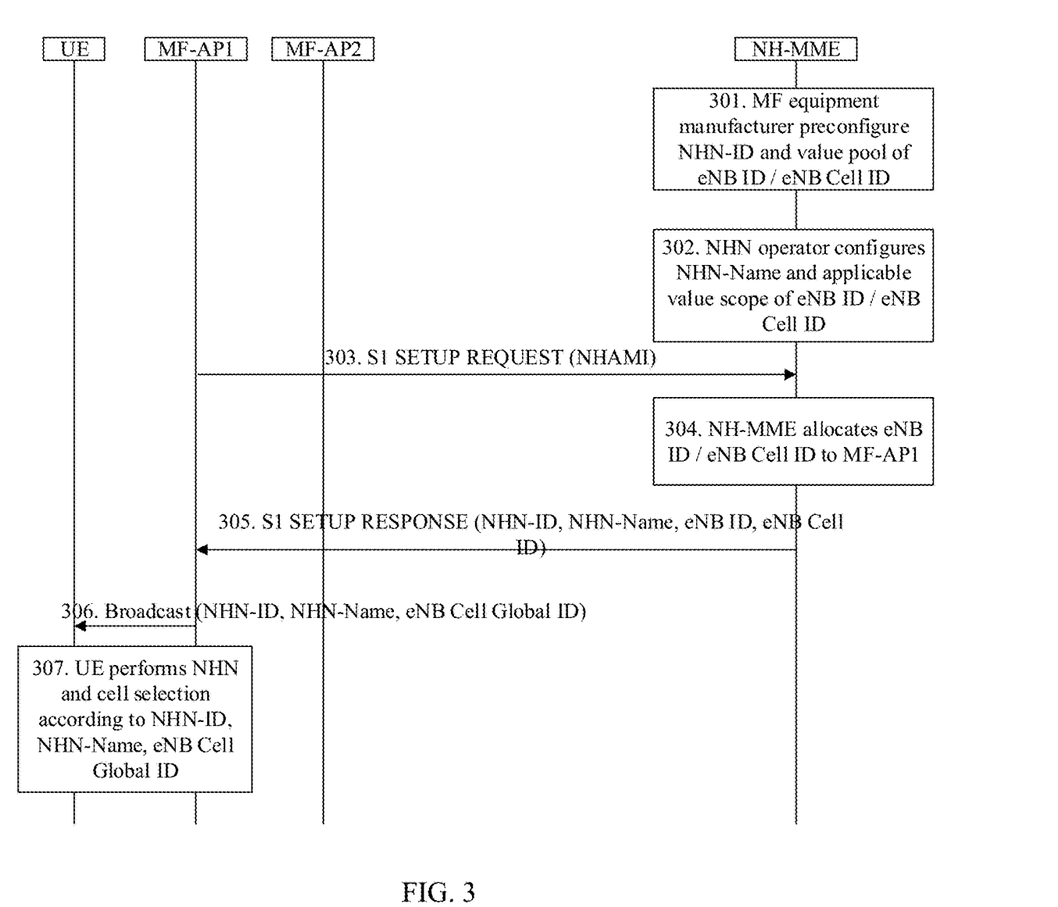
FIG. 3 is a flowchart of a method of configuring parameters for a base station according to a first embodiment of the application.
Figure 4:
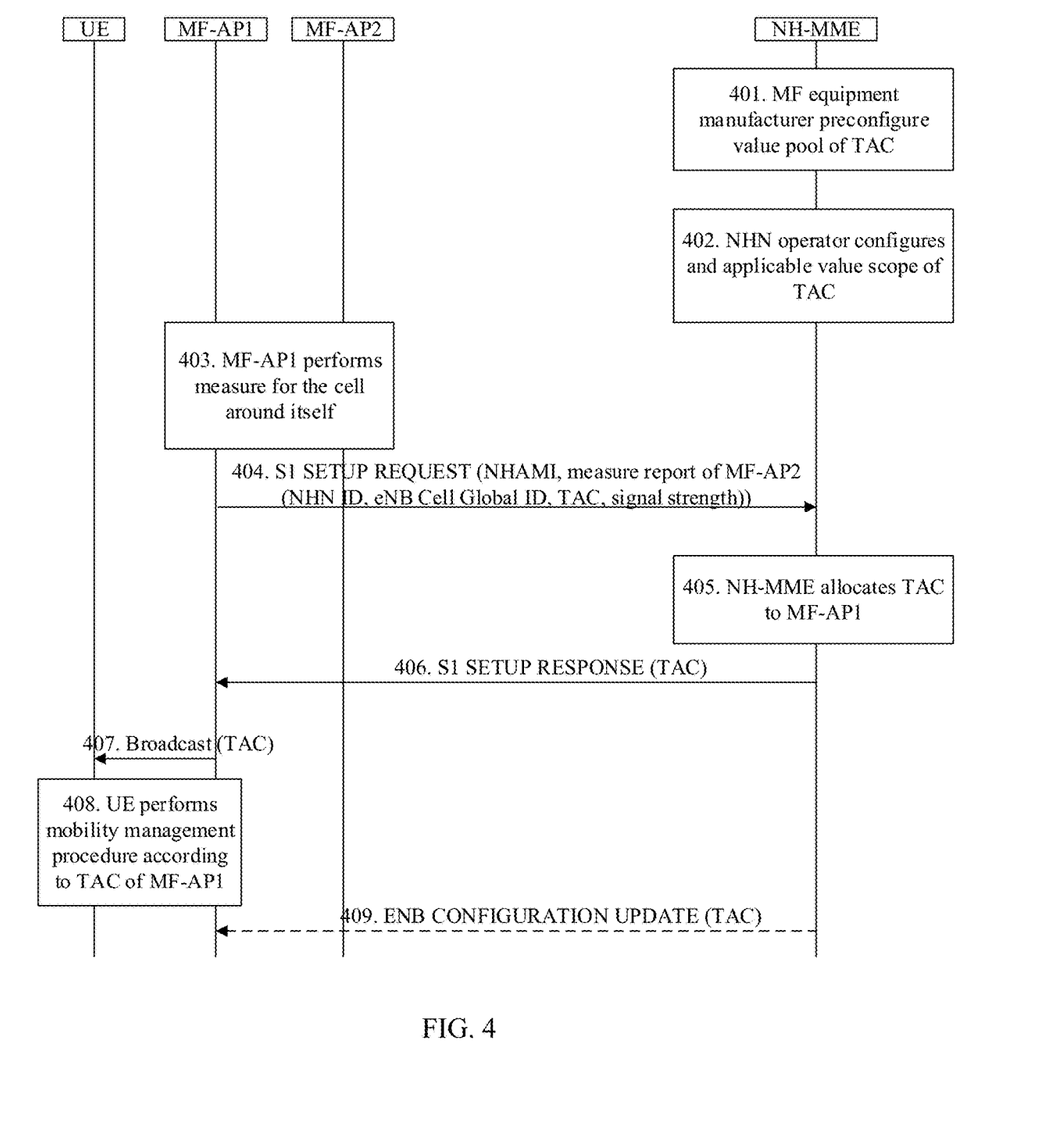
FIG. 4 is a flowchart a method of configuring parameters for a base station according to a second embodiment of the application.
Figure 5:
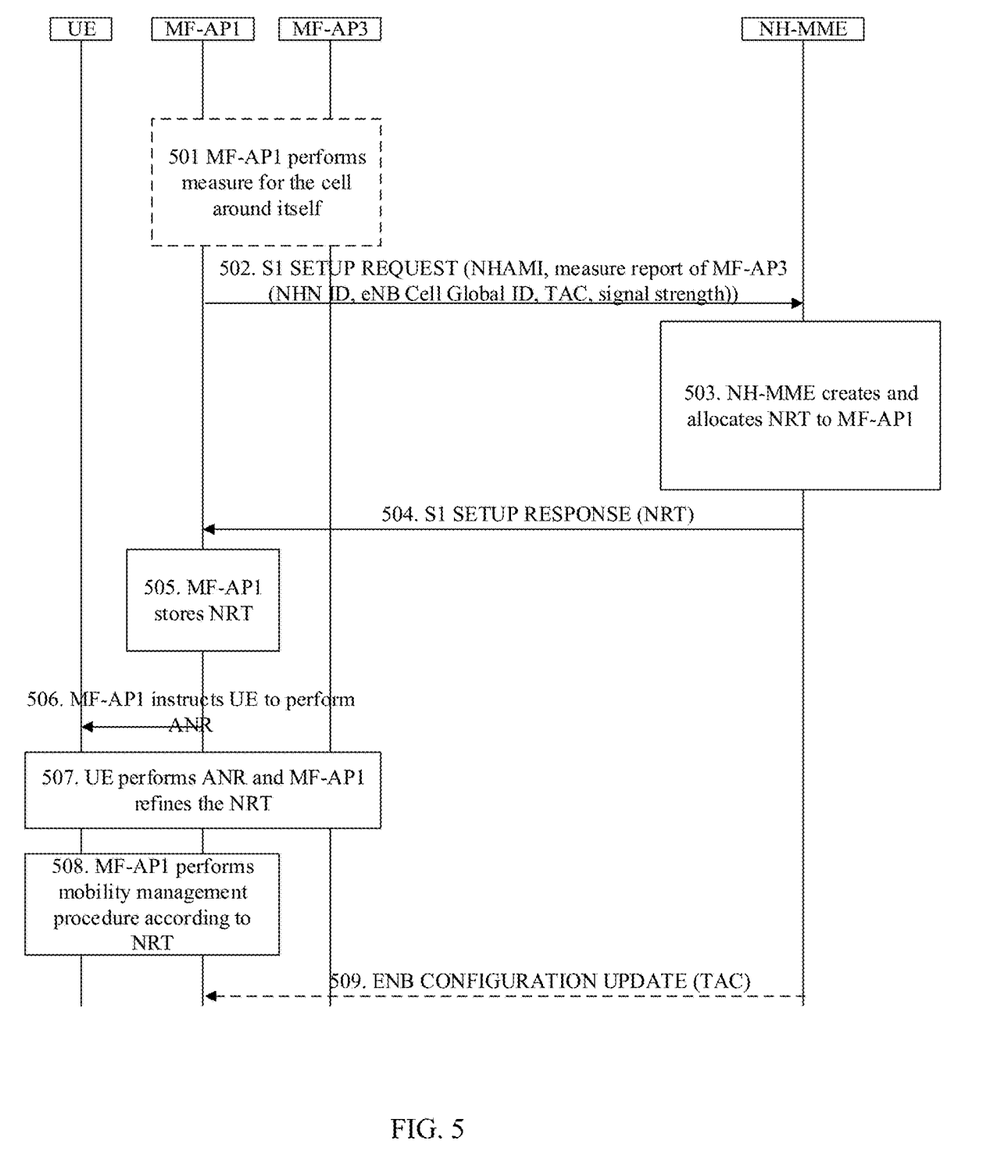
FIG. 5 is a flowchart of a method of configuring parameters for a base station according to a third embodiment of the application.

Based on the above description and FIG. 2, the following embodiments, as illustrated in FIGS. 3, 4 and 5, are provided. In these exemplary embodiments, it is assumed that the access network is a MulteFire network. MulteFire is a technology for deploying LTE in unlicensed spectrum. MulteFire allows the standalone use of LTE in unlicensed spectrum. MulteFire can be used to deploy mobile broadband data services and support Voice over LTE. It can support handovers among cells in a small-cell deployment and is capable of interworking with external mobile networks for service continuity.

In a conceptual MulteFire network, the network controller is a NH-MME, the base station is a MF-AP, and the terminal equipment is a UE. The network ID is a Neutral Host network-ID (NHN-ID) and the network name is a NHN-Name. The base station ID is an eNB ID, and the base station cell ID is an eNB Cell ID. The tracking location ID is a TAC or a TAC plus Neutral Host Access Mode Indicator (NHAMI). The registration request is a S1 setup request, and the registration response is S1 setup response. The configuration update message is an enb configuration update message. It should be understood by those skilled in the art that these specific network elements, specific parameters and specific messages may be replaced by other possible network elements, parameters, and messages.

There are some information and parameters need to be configured in a MF-AP when a Neutral Host network (NHN) mode MulteFire network is deployed. The information and parameters include, but not limited to, a NHN-ID, a NHN-Name, a NRT, an eNB ID, an eNB Cell ID, and a TAC. In the LTE system, these parameters and information (or similar conceptual information) are configured in eNB directly by dedicated network management elements and procedures. In current MulteFire standards, the operations, administration and maintenance (OAM) mechanisms are not defined. For the MulteFire network (especially for NHN access mode) deployment, it needs to be considered that no dedicated network management elements are involved in the NHN mode.

In a MulteFire network, a NH-MME configures a NHN-ID, a NHN-Name, and an eNB ID, an eNB Cell ID, a TAC by providing these parameters and information via message from the NH-MME to the MF-AP in a S1 setup or a eNB configuration update procedure, which can simplifying the deployment and initial configuration of the NHN mode MulteFire network. A NHN-ID and a maximum value pool of eNB ID, eNB Cell ID, or TAC can be preconfigured by a MulteFire (MF) equipment manufacturer in each NH-MME, and a NHN operator can subsequently limit the applicable value scopes of eNB ID, eNB Cell ID, or TAC. A NHN-Name can be configured by a NHN operator freely in a human-readable form. When the MF-AP is configured as a part of the specific NHN and initiates a S1 setup, the NH-MME delivers the NHN-ID, the NHN-Name and allocates an eNB ID, an eNB Cell IDs or a TAC according to the applicable value scope of eNB ID, eNB Cell ID, or TAC for each MF-AP in a S1 SETUP RESPONSE message. The eNB ID, eNB Cell ID, or TAC plus NHAMI respectively are equal to Global eNB ID, E-UTRAN cell global identifier (ECGI) and Tracking Area Identity (TAI). In one instance, during allocating the TAC, the MF-AP (e.g. newly performing S1 setup) may previously sends measurement report of neighbor cells to the NH-MME and the NH-MME may know which already registered (via S1 setup procedure) MF-APs are near the newly registered MF-AP and select one TAC supported by the nearest (according to the signal strength) registered MF-AP(s). In one instance, the easier way is to restrict one MF-AP only supports one TAC.

Neutral Host Network ID (NHN-ID) is an identifier of a Neutral Host Network that is accessible via a MF cell. NHN-ID is advertised in broadcast channels. Two categories of NHN-IDs are available for Neutral Host Networks: Self-selected NHN-ID and Globally unique NHN-ID. Length of the NHN-ID is 40 bits. A UE performs cell reselection or cell selection between two MF-Cells with the same NHN-ID. The UE can assume that they support the same set of participant Service providers (PSPs). UE performs MF network selection between MF cells with different NHN-IDs. One globally unique NHN-ID is preconfigured by MF equipment manufacturer in each NH-MME. The MF-AP retrieves the NHN-ID from the NH-MME in S1 SETUP RESPONSE message when the MF-AP is configured as a part of the specific NHN. NHN operator can change the NHN-ID as the Self-selected NHN-ID while deploying but it is not recommended, except special usage.

Neutral Host Network Name (NHN-Name) is a user-friendly name of the NHN network. It is advertised in broadcast channels but potentially less frequently than the NHN-ID. NHN-Name is configured by NHN operator in each NH-MME. The MF-AP retrieves the NHN-Name from the NH-MME in S1 SETUP RESPONSE message when the MF-AP is configured as a part of the specific NHN.

Neutral Host Access Mode Indicator (NHAMI) is a reserved global value that is used in lieu of network specific PLMN-ID values within all MulteFire networks enabling NHN Access Mode. Note that all Neutral Host Networks utilize the same NHAMI value and thus NHAMI cannot be interpreted as an actual identifier for the specific Neutral Host Network.

The NRT is configured by providing it via a message from the NH-MME to the MF-AP in a S1 setup or an eNB configuration update procedure which can simplifying the deployment and initial configuration of the NHN mode MulteFire network. The NH-MME sends a raw NRT to the MF-AP in a S1 SETUP RESPONSE message while the MF-AP is configured as a part of the specific NHN and performs a S1 setup. The raw NRT for each newly registering MF-AP is created by the NH-MME according to the already registered MF-AP (via S1 SETUP REQUEST message) on the NH-MME within the same NHN. The NH-MME will renew the table with ENB CONFIGURATION UPDATE message while other new MF-AP registers. The MF-AP will refine the NRT via Automatic Neighbor Relation (ANR) procedures. During creating a raw NRT, the MF-AP (e.g. newly performing S1 setup) may previously sends measurement report of neighbor cells to the NH-MME and the NH-MME may know which already registered (via S1 setup procedure) MF-APs are near the newly registered MF-AP and will add these cells in the NRT.

First Embodiment

A method of configuring parameters for a base station according to a first embodiment is shown in FIG. 3, in which a NHN-ID, a NHN-Name, an eNB ID, and an eNB Cell ID are configured by the following steps.

Step 301. A MF equipment manufacturer pre-configures a NHN-ID and a maximum value pool of eNB ID or eNB Cell ID. The NHN-ID preconfigured by the MF equipment manufacturer may be globally unique. Generally, an eNB ID is 20 leftmost bits of a 28-bit eNB Cell ID, and the rest 8 bits is Cell ID. The MF equipment manufacturer may allocate all possible value as the maximum value pool.

Step 302. NHN operator configures a NHN-Name and an applicable value scope of eNB ID or eNB Cell ID while deploying a NH-MME in the NHN network with the NHN-ID in step 1. The applicable value scope of eNB ID, or eNB Cell ID may be a maximum value pool or all possible value preconfigured by the MF equipment manufacturer if the NHN operator does not give a configuration. The NHN-Name is in a human readable form.

Step 303. When a new MF-AP1 starts to be connected to the NH-MME as a part of this NHN network. The MF-AP1 sends a S1 SETUP REQUEST (with NHAMI) to the NH-MME.

Step 304. The NH-MME allocates an eNB ID, or eNB Cell ID to the MF-AP1, the values of which are in the scope of step 302. The NH-MME needs to make sure the eNB ID, or eNB Cell ID of each MF-AP, each cell of the MF-AP is unique in the specific NHN network.

Step 305. The NH-MME sends the NHN-ID, the NHN-Name, the eNB ID, and the eNB Cell ID to the MF-AP1 in a S1 SETUP RESPONSE. The NH-MME may also response these parameters to the MF-AP when the MF-AP1 sends other parameter configuration request.

Step 306. The MF-AP1 broadcasts the NHN-ID, the NHN-Name, the eNB Cell Global ID to the UE. The eNB Cell Global ID is equal to NHAMI plus eNB Cell ID.

Step 307. UE performs NHN selection and cell selection according to NHN-ID, NHN-Name, eNB Cell Global ID.

In this embodiment, a maximum value pool of eNB ID, or eNB Cell ID are preconfigured by a MF equipment manufacturer in each NH-MME, and a NHN operator can subsequently limit the applicable value scope. When a MF-AP is configured as a part of the specific NHN and initiates S1 setup, the NH-MME allocates an eNB ID or an eNB Cell IDs according to the applicable value scope for each MF-AP in S1 SETUP RESPONSE message. The eNB ID or eNB Cell IDs plus NHAMI respectively are equal to Global eNB ID, and ECGI.

Second Embodiment

A method of configuring parameters for a base station according to a second embodiment of the application is shown in FIG. 4. A TAC is configured by the following steps.

Step 401. A MF equipment manufacturer pre-configures a maximum value pool of TAC.

Step 402. A NHN operator may configure an applicable value scope of TAC while deploying a NH-MME in the NHN network. The applicable value scope of TAC may be a maximum value pool or all possible value preconfigured by the MF equipment manufacturer if the NHN operator does not give a configuration.

Step 403. Optionally, when a new MF-AP1 starts to be connected to the NH-MME as a part of this NHN network, it performs measurement of neighbor cell(s) (e.g., MF-AP2) to get the NHN ID, the eNB Cell Global ID, the TAI, and the signal strength of the neighbor cells.

Step 404. The MF-AP1 sends S1 SETUP REQUEST (NHAMI, measurement report of the MF-AP2 (NHN ID, eNB Cell Global ID, TAI, signal strength)) to the NH-MME.

Step 405. The NH-MME allocates a TAC to the MF-AP1, the values of which are in the scope of step 402. The NH-MME may know which already registered (via e.g., S1 setup procedure previously) MF-APs (e.g., the MF-AP2) are near the newly registering MF-AP1 and select one TAC supported by the nearest (according to the signal strength) registered MF-AP(s). A topological algorithm (e.g., creating a MF-AP signal strength map in advance) may be needed in the NH-MME to allocate the TAC. The easier way is to restrict one MF-AP only supports one TAC, then the NH-MME will allocates one unique TAC in this NHN network to the MF-AP.

Step 406. The NH-MME sends the TAC to the MF-AP1 in a S1 setup response. The NH-MME may also response this parameter to the MF-AP1 when the MF-AP1 sends other parameter configuration request.

Step 407. The MF-AP1 broadcasts the TAI to the UE. The TAI is equal to the NHAMI plus the TAC.

Step 408. UE performs mobility management procedures according to the TAI.

Step 409. The NH-MME may change the TAC of the MF-AP1 in ENB configuration update (TAC) message.

Also, the MF-AP1 may perform measurement of neighbor cells and report it to the NH-MME after the S1 setup. In this case, the MF-AP1 may only measure and report the measurement of neighbor cells of the same NHN-ID as the NHN-ID has already been sent to the MF-AP1 in S1 setup response. And the NH-MME may allocate the TAC of the MF-AP1 in ENB configuration update (TAC) message.

In this embodiment, a maximum value pool of TAC is preconfigured by a MF equipment manufacturer in each NH-MME, and a NHN operator can subsequently limit the applicable value scope. When a MF-AP is configured as a part of the specific NHN and initiates S1 setup, the NH-MME allocates a TAC according to the applicable value scope for each MF-AP in S1 SETUP RESPONSE message. The TAC plus NHAMI respectively are equal to TAI. In one instance, the NH-MME allocates the TAC to each MF-AP according to the signal measurement report of the neighbor cells (sent in S1 SETUP REQUEST message by the MF-AP), but it depends on the capability of the MF-AP (whether the MF-AP have a capability to perform measurement of neighbor cell(s)) and the topological algorithm of the NH-MME. In this way, the NH-MME may know which previously registered (via S1 setup procedure) MF-APs are near the newly registered MF-AP and select one TAC supported by the nearest (according to the signal strength) registered MF-AP(s). In one instance, the easier way is to restrict one MF-AP only supports one TAC.

Third Embodiment

A method of configuring parameters for a base station according to a third embodiment of the application is shown in FIG. 5. A Neighbor Relation Table (NRT) is configured by the following steps.

Step 501. Optionally, when a new MF-AP1 starts to be connected to a NH-MME as a part of a NHN network, it performs measurement of neighbor cell(s) (e.g., MF-AP3) to get a NHN ID, an eNB Cell Global ID, a TAI, and a signal strength of the neighbor cells.

Step 502. The MF-AP1 sends a S1 SETUP REQUEST (NHAMI, measurement report of the MF-AP3 (NHN ID, eNB Cell Global ID, TAI, signal strength)) to the NH-MME.

Step 503. The NH-MME creates a NRT for the MF-AP1. According to the measurement report in step2, the NH-MME may know which already registered (via e.g., S1 setup procedure previously) MF-APs (e.g., the MF-AP3) are near the newly registering MF-AP1 and will add these cells in the raw NRT. A topological algorithm (e.g., creating a MF-AP signal strength map in advance) may be needed in the NH-MME to create the NRT.

Step 504. The NH-MME sends the NRT to the MF-AP1 in a S1 setup response message. The NH-MME may also response the NRT to the MF-AP1 when the MF-AP1 sends other parameter configuration request.

Step 505. The MF-AP1 stores the raw NRT.

Step 506. The MF-AP1 instructs UE to perform ANR.

Step 507. The UE performs ANR and the MF-AP1 refines the NRT according to ANR.

Step 508. The MF-AP1 performs mobility management procedure (e.g., Handover to the MF-AP3) according to the NRT.

Step 509. The NH-MME may update the NRT of the MF-AP1 in ENB configuration update (NRT) message.

Also, the MF-AP1 may perform measurement of neighbor cells and report it to the NH-MME after the S1 setup. In this case, the MF-AP1 may only measure and report the measurement of neighbor cells of the same NHN-ID as the NHN-ID has already been sent to the MF-AP1 in a S1 setup response. And the NH-MME may create the NRT of the MF-AP1 in ENB configuration update (NRT) message.

In this embodiment, the NH-MME sends a raw NRT to a MF-AP in a S1 SETUP RESPONSE message while the MF-AP is configured as a part of the specific NHN and performs the S1 setup. The raw NRT for each newly registering MF-AP is created by the NH-MME according to the already registered MF-AP (via the S1 SETUP REQUEST message) on the NH-MME within the same NHN. The NH-MME will update the NRT with ENB CONFIGURATION UPDATE message while other new MF-AP registers. The MF-AP will refine the NRT via a ANR procedures, in the way of that the ANR function resides in the MF-AP and manages the raw Neighbor Relation Table (NRT). Located within ANR, the Neighbor Detection Function finds new neighbors and adds them to the NRT (ANR also contains the Neighbor Removal Function which removes outdated NRs).

In one instance, the NH-MME creates the raw NRT and sends to each newly registering MF-AP according to the already registered MF-AP on itself in S1 setup, and will update the table in eNB with ENB CONFIGURATION UPDATE message while other new MF-AP performs registration to the NH-MME via a S1 setup. The MF-AP will refine the NRT via (ANR) procedures.

In one instance, the NH-MME creates the raw NRT according to the signal measurement report of the neighbor cells (sent in the S1 SETUP REQUEST message by the MF-AP), but it depends on the capability of the MF-AP (whether the MF-AP have a capability to perform measurement of neighbor cell(s)). That is, the MF-AP may send measurement reports of neighbor cells to the NH-MME, and the NH-MME may create the Neighbor Relation Table according to the signal measurement report and the already registered MF-AP on the NH-MME within the same NHN.

The foregoing detailed description has set forth various embodiments of processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively by a wide range of hardware, software, firmware, or virtually any combination thereof.

Figure 6:
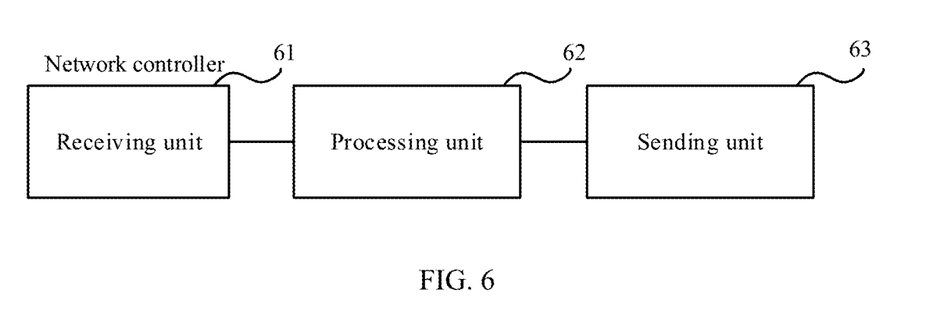
FIG. 6 is a simplified functional block diagram of a network controller apparatus according to the present application.

FIG. 6 is a simplified functional block diagram of a network controller apparatus. The network controller apparatus may be the mobility management function in a MME, an AMF, or a mobility management function in an NH-MME, and so on. The network controller apparatus includes a receiving unit 61, a processing unit 62, and a sending unit 63. The network controller apparatus is configured to perform the above-described methods, for example the method shown in FIGS. 2-5. For example, the processing unit 62 supports the network controller apparatus to perform the step 202 in FIG. 2, the step 304 in FIG. 3, the step 405 in FIG. 4, the step 503 in FIG. 5, or other steps described in the above embodiments. The network controller apparatus may further include a memory storing program code and data for realizing the configuration functions. The receiving unit 61 and the sending unit 63 support the network controller apparatus to communicate with other network entities. The communication with the other network entities may include communication with the base station 1 in FIG. 2, communication with the MF-AP1 in FIG. 3, communication with the MF-AP1 in FIG. 4, and communication with other network entities described in the above embodiments. The receiving unit 61, the processing unit 62, the sending unit 63 and the memory are connected via a communication bus.

Figure 7:
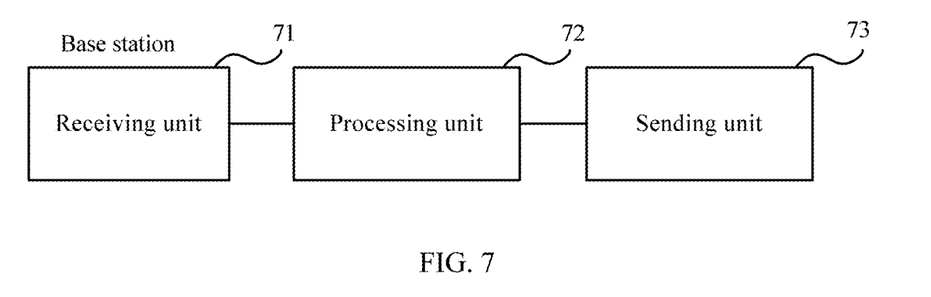
FIG. 7 is a simplified functional block diagram of a base station apparatus according to the present application.

FIG. 7 is a simplified functional block diagram of a base station apparatus. The base station apparatus may be an eNB, a base station in a 5G communication system, a MF-AP, and so on. The base station apparatus includes a receiving unit 71, a processing unit 72 and a sending unit 73. The base station apparatus is configured to perform the above methods, for example methods shown in FIGS. 2-5.

For example, the processing unit 72 supports the base station apparatus to perform the step 403 in FIG. 4, the step 501 in FIG. 5, or other steps described in the above embodiments. The base station apparatus may further include a memory storing program code and data for realizing the accessing functions. The receiving unit 71 and the sending unit 73 support the base station apparatus to communicate with other network entities. The communication with the other network entities may include communication with the network controller in FIG. 2, communication with the MF-AP2 and the NH-MME in FIG. 3, communication with the MF-AP2 and the NH-MME in FIG. 4, communication with the MF-AP3 and the NH-MME in FIG. 5, and communication with other network entities described in the above embodiments. The receiving unit 71, the processing unit 72, the sending unit 73, and the memory are connected via a communication bus.

Figure 8:
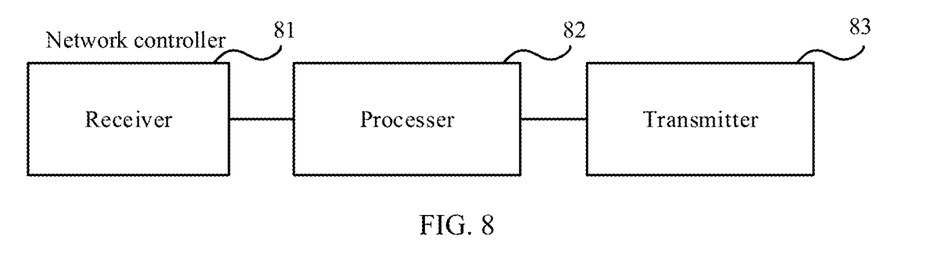
FIG. 8 is a schematic structural diagram of a network controller apparatus according to the present application.

FIG. 8 is a simplified block diagram of a network controller apparatus. The network controller is a physical networking device. It is implemented in a network to realize the mobility management function in a MME, an AMF, or a mobility management function in an NH-MME, and so on. The network controller apparatus includes a receiver 81, a processer 82 and a transmitter 83. The network controller apparatus performs the above methods, for example the method shown in FIGS. 2-5. For example, the processer 82 supports the network controller apparatus to perform the step 202 in FIG. 2, the step 304 in FIG. 3, the step 405 in FIG. 5, the step 503 in FIG. 5, or other step described in the above embodiments. The network controller apparatus may further include a memory configured to store program code and data. The receiver 81 and the transmitter 83 support the network controller apparatus to communicate with other network entities. The communication with the other network entities may include communication with the base station 1 in FIG. 2, communication with the MF-AP1 in FIG. 3, communication with the MF-AP1 in FIG. 4, communication with the MF-AP1 in FIG. 4, or communication with other network entities described in the above embodiments. The receiver 81, the processer 82, the transmitter 83 and the memory are connected via a communication bus.

Figure 9:
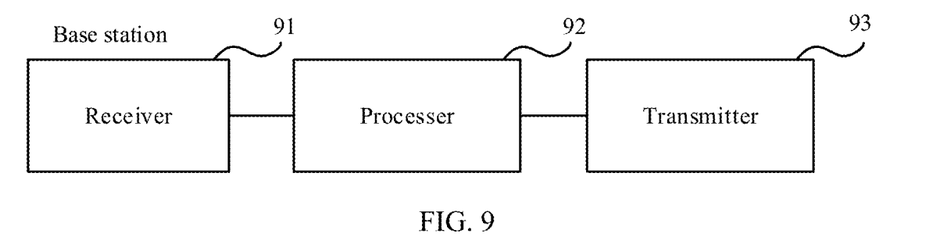
FIG. 9 is a simplified structural diagram of a base station apparatus according to the present application.

FIG. 9 is a simplified block diagram of a base station apparatus. The base station may be an eNB, a base station in a 5G communication system, a MF-AP, and so on. The base station apparatus includes a receiver 91, a processer 92 and a transmitter 93. The base station apparatus performs the above methods, for example the method shown in FIGS. 2-5. For example, the processer 92 supports the apparatus to perform the step 403 in FIG. 4, the step 501 in FIG. 5, or other steps described in the above embodiments. The base station apparatus may further include a memory storing program code and data. The receiver 91 and the transmitter 93 support the base station apparatus to communicate with other network entities. For example, the communication with the other network entities may include communication with the base station network controller in FIG. 2, communication with the MF-AP2 and the NH-MME in FIG. 3, communication with the MF-AP2 and the NH-MME in FIG. 4, communication with the MF-AP3 and the NH-MME in FIG. 5, or communication with other network entities described in the above embodiments. The receiver 91, the processer 92, the transmitter 93, and the memory are connected via a communication bus.

Figure 10:
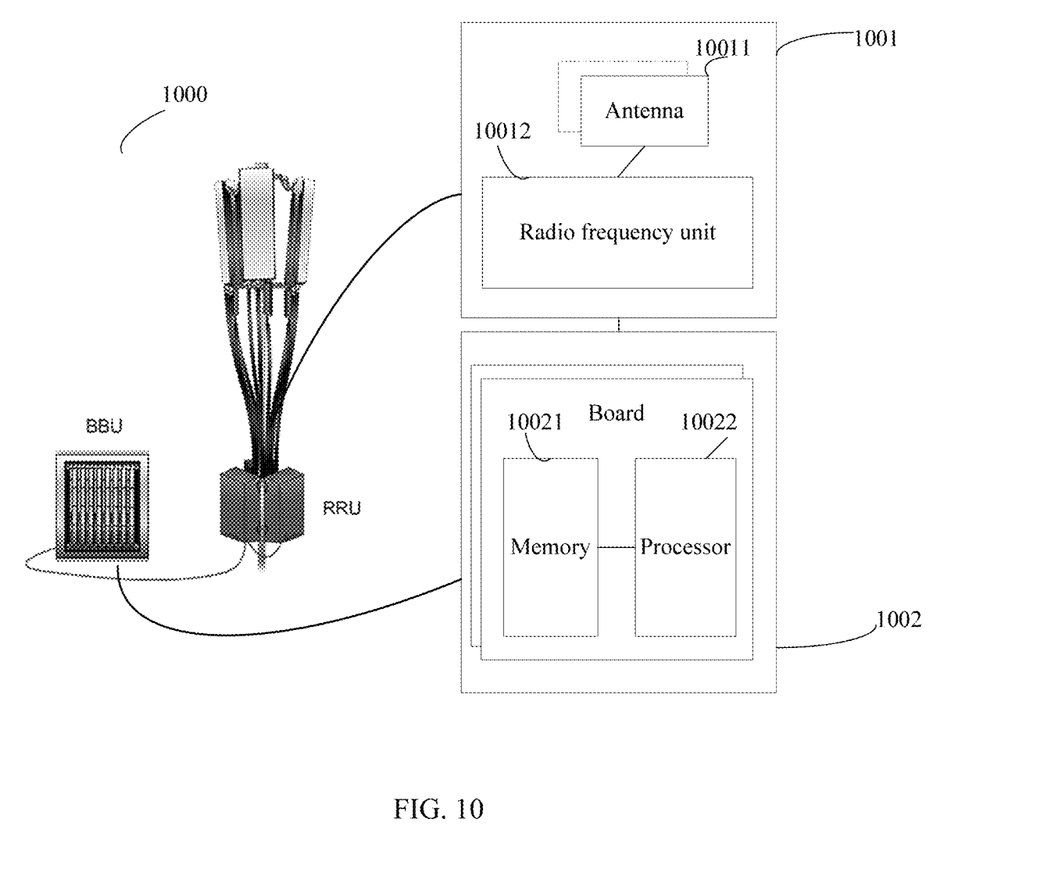
FIG. 10 is a schematic block diagram of a base station apparatus according to the present application.

A general structural composition of a base station in a communication network is shown in FIG. 10. The base station may be an eNB, a base station in a 5G communication system, a MF-AP, and so on. The base station is capable of performing the methods described in the above embodiments, for example the methods shown in FIGS. 2-5. The base station 1000 includes one or more remote radio units (RRU) 1001 and one or more baseband units (BBU) 1002.

The RRU 1001 may be referred to as a transceiver unit, a transceiver, a transceiver circuit, or a transceiver, and so on, which may include at least one antenna 10011 and a radio frequency unit 10012. The RRU 1001 is mainly used for the transmitting and receiving of radio frequency signals and converting the radio frequency signals to baseband signals.

The BBU 1002 is a control center of the base station, and may be referred to as a processing unit. The processing unit is configured to perform baseband processing functions such as channel coding, multiplexing, modulation, spreading, and so on. For example, the BBU may be used to control the base station to perform the steps performed by the base station in FIGS. 2-5. In one instance, the BBU 1002 may include one or more integrated circuits (or known as boards or chips), and the boards may support a same access standard radio access network or the boards may support different access system access networks. The BBU 1002 includes a memory 7021 and a processor 10022. The memory 10021 is used to store the necessary instructions and data for operation of the base station. For example, the memory 10021 stores the configuration information as described in the above embodiments. The processor 10022 supports the base station to perform the step 403 in FIG. 4, the step 501 in FIG. 5, or other steps described in the above embodiments. The memory 10021 and the processor 10022 may be built in one or more boards. In other words, each board may have its own memory and processor circuits, or multiple boards form the memory and/or processor.

The above apparatus may utilize all of the components shown, or only a subset of the components and levels of integration may vary from apparatus to apparatus. Furthermore, an apparatus may contain multiple instances of a component, such as multiple processing units, processors, memories, senders, receivers, etc. The processing unit or processor may include a central processing unit (CPU), memory, a mass storage device, a video adapter, and an I/O interface connected to a bus. The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In one instance, the memory may include ROM for use at boot-up, and DRAM for program and data storage for use while executing programs. The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The sender or receiver may includes one or more network interfaces, which may comprise wired links, such as an Ethernet cable or the like, and/or wireless links to access nodes or different networks. The network interface allows the apparatus to communicate with remote units via the networks. For example, the network interface may provide wireless communication via one or more transmitters/transmit antennas and one or more receivers/receive antennas. In one instance, the apparatus is coupled to a local-area network or a wide-area network for data processing and communications with remote devices, such as other processing units, the Internet, remote storage facilities, or the like.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed.

Persons of ordinary skill in the art should understand that all or part of the subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored there on computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

Finally, it should be understood that the above description and embodiments are only used to explain, but not to limit the technical solution of the present application. Despite the detailed description of the present application with reference to above preferred embodiments, it should be understood that various modifications, changes or equivalent replacements can be made by those skilled in the art without departing from the scope of the present application and covered in the claims of the present application.

What is claimed is:

1. A method of configuring parameters for a base station, wherein the method comprises:
   receiving, by a network controller, a registration request from the base station, wherein the network controller is responsible for mobility management of a terminal;
   obtaining, by the network controller, wireless configuration parameters for the base station, wherein the wireless configuration parameters comprise at least one of a network identifier (ID) of a network to which the network controller belongs or a network name of the network, and wherein the wireless configuration parameters further comprise at least one of a base station ID of the base station or a base station cell ID of a cell corresponding to the base station;
   sending, by the network controller, the wireless configuration parameters to the base station; and
   receiving, by the network controller, a connection request from the terminal via the base station.

2. The method of claim 1, wherein the wireless configuration parameters further comprise at least one of:
   a tracking location ID of the base station; or
   a neighbor relation table (NRT) comprising information of one or more neighbor cells of the cell corresponding to the base station.

3. The method of claim 2, wherein the wireless configuration parameters allow the base station to communicate with the terminal, and wherein obtaining the wireless configuration parameters for the base station comprises allocating, by the network controller, the base station ID, the base station cell ID, or the tracking location ID according to preset value ranges, wherein a first preset value range for the base station ID is allocated by a manufacturer, a second preset value range for the base station cell ID is allocated by the manufacturer, or a third preset value range for the tracking location ID is allocated by a network operator, wherein the base station is in direct wireless communication with the terminal via a wireless link, wherein the wireless link is the only wireless portion of a communication path between the terminal and the network controller, and wherein the base station has a non-wireless connection to a data network.

4. The method of claim 2, further comprising obtaining, by the network controller, a signal measurement report of one or more neighbor cells of the base station, wherein for each of the one or more neighbor cells, the signal measurement report comprises at least one of a network ID of the neighbor cell, a network name of a network of the neighbor cell, a base station ID of a base station that serves the neighbor cell, a base station cell ID of the neighbor cell, a tracking location ID of the neighbor cell, or a signal strength, and wherein obtaining the wireless configuration parameters for the base station comprises:
   allocating, by the network controller, the tracking location ID of the base station according to the signal measurement report; or
   creating, by the network controller, the NRT according to the signal measurement report.

5. The method of claim 2, further comprising:
   updating, by the network controller, the NRT when another base station is added; and
   sending, by the network controller, the updated NRT to the base station.

6. The method of claim 1, wherein the network controller is a mobility management function in a mobility management entity (MME), an access and mobility management function (AMF), or a neutral host-mobility management entity (NH-MME).

7. A method of configuring parameters for a base station, wherein the method comprises:
   sending, by the base station, a registration request to a network controller of a network;
   receiving, by the base station from the network controller, wireless configuration parameters for the base station, wherein the wireless configuration parameters comprise at least one of a network identifier (ID) of a network to which the network controller belongs or a network name of the network, and wherein the wireless configuration parameters further comprise at least one of a base station ID of the base station or a base station cell ID of a cell corresponding to the base station;
   broadcasting, by the base station, the wireless configuration parameters to a terminal;
   receiving, by the base station via a wireless link, a connection request from the terminal, wherein the base station is an evolved node B (eNB) in a long term evolution (LTE) system, an access network (AN) in a fifth generation (5G) communication system, or a MulteFire-Access point (MF-AP) in a MulteFire network; and subsequent to receiving the connection request, sending, by the base station, the connection request to the network controller.

8. The method of claim 7, wherein the wireless configuration parameters further comprise at least one of:
a tracking location ID of the base station; or
a neighbor relation table (NRT) comprising information of one or more neighbor cells of the cell corresponding to the base station.

9. The method of claim 8, further comprising:
performing, by the base station, measurement of one or more neighbor cells to obtain a signal measurement report of the one or more neighbor cells; and
sending, by the base station, the signal measurement report to the network controller, wherein the signal measurement report of each of the one or more neighbor cells comprises at least one of a network ID of a network corresponding to the neighbor cell, a network name of the network corresponding to the neighbor cell, a base station ID of the base station that serves the neighbor cell, a base station cell ID of the neighbor cell, a tracking location ID of the neighbor cell, or a signal strength, wherein the wireless link is the only wireless portion of a communication path between the terminal and the network controller.

10. The method of claim 9, further comprising:
allocating the tracking location ID by the network controller according to the signal measurement report; or
creating the NRT by the network controller according to the signal measurement report, wherein the base station is coupled to a data network via a user plane entity, and wherein the user plane entity is a serving gateway (SGW) and a packet data network gateway (PGW) in the LTE system, a user plane function (UPF) in the 5G system, or a neutral host-gateway (NH-GW) in the MulteFire network.

11. The method of claim 8, further comprising receiving, by the base station, an updated NRT from the network controller when another base station is added to the network, wherein the base station is coupled to a session management entity via the network controller, wherein the session management entity is a session management function in a mobility management entity (MME) in the LTE system, a session management function (SMF) in the 5G system, or a session management function in a neutral host-MME (NH-MME) in the MulteFire network, wherein the base station is coupled to the data network via a user plane entity, and wherein the user plane entity is a serving gateway (SGW) and a packet data network gateway (PGW) in the LTE system, a user plane function (UPF) in the 5G system, or a neutral host-gateway (NH-GW) in the MulteFire network.

12. A network controller, comprising:
a memory comprising instructions; and
a processor coupled to the memory and configured to execute the instructions, which causes the network controller to be configured to:
receive a registration request from a base station;
obtain wireless configuration parameters for the base station, wherein the wireless configuration parameters comprise: a network identifier (ID) of a network to which the network controller belongs, a network name of the network, a base station ID of the base station, a base station cell ID of a cell that the network controller corresponding to the base station, a tracking location ID of the base station, and a neighbor relation table (NRT) comprising information of one or more neighbor cells of the cell corresponding to the base station;
send the wireless configuration parameters to the base station; and
receive a connection request from a terminal via the base station according to the wireless configuration parameters of the base station.

13. The network controller of claim 12, wherein the base station communicates wirelessly with the terminal via a wireless link, wherein the wireless link is the only wireless portion of a communication path between the terminal and the network controller wherein the base station has a non-wireless connection to a data network, and wherein the processor is further configured to either:
send the network ID or the network name to the base station, wherein the network ID or the network name are configured by a manufacturer or a network operator; or
allocate the base station ID, the base station cell ID, or the tracking location ID according to preset value ranges of the base station ID, the base station cell ID, or the tracking location ID, wherein the preset value ranges are configured by the manufacturer or the network operator.

14. The network controller of claim 12, wherein the processor is further configured to obtain a signal measurement report of one or more neighbor cells from the base station, wherein for each neighbor cell of the one or more neighbor cells, the signal measurement report comprises at least one of a network ID corresponding to the neighbor cell, a network name corresponding to the neighbor cell, a base station ID of a base station that serves the neighbor cell, a base station cell ID of the neighbor cell, a tracking location ID of the neighbor cell, or a signal strength, and wherein the processor is configured to obtain the wireless configuration parameters at least in part by being configured to:
allocate the tracking location ID to the base station according to the signal measurement report; or
create the NRT according to the signal measurement report.

15. The network controller of claim 12, wherein the network controller is responsible for mobility management of a terminal, wherein the wireless configuration parameters allow the base station to communicate with the terminal, and wherein the processor is further configured to:
update the NRT when another base station is added; and
send the updated NRT to the base station.

16. The network controller of claim 12, wherein the network controller is a mobility management function in a mobility management entity (MME), an access and mobility management function (AMF), or a neutral host-mobility management entity (NH-MME).

17. A base station, comprising:
a memory comprising instructions; and
a processor coupled to the memory and configured to execute the instructions, which causes the base station to be configured to:
send a registration request message to a network controller of a network;
receive, from the network controller, wireless configuration parameters of the base station, wherein the wireless configuration parameters comprise at least one of a network identifier (ID) of a network to which the network controller belongs or a network name of the network, and wherein the wireless configuration parameters further comprise at least one of a base station ID of the base station or a base station cell ID of a cell corresponding to the base station,
broadcast the wireless configuration parameters to a terminal;
receive a connection request from the terminal; and
subsequent to receiving the connection request, send the connection request to the network controller,
wherein the base station is an evolved node B (eNB) in a long term evolution (LTE) system, an access network (AN) in a fifth generation (5G) communication system, or a MulteFire-Access point (MF-AP) in a MulteFire network.

18. The base station of claim 17, wherein the wireless configuration parameters further comprise at least one of:
a tracking location ID of the base station; or
a neighbor relation table (NRT) comprising information of one or more neighbor cells of the cell corresponding to the base station.

19. The base station of claim 18, wherein the processor is further configured to:
measure one or more neighbor cells to obtain a signal measurement report of the one or more neighbor cells; and
send the signal measurement report to the network controller, wherein for each neighbor cell of the one or more neighbor cells, the signal measurement report comprises at least one of a network ID corresponding to a network of the neighbor cell, a network name of a network of the neighbor cell, a base station ID of a base station that serves the neighbor cell, a base station cell ID of the neighbor cell, a tracking location ID of the neighbor cell, or a signal strength.

20. The base station of claim 19, wherein the base station is in direct wireless communication with the terminal via a wireless link, wherein the wireless link is the only wireless portion of a communication path between the terminal and the network controller, wherein the network controller is responsible for mobility management of a terminal, wherein the base station has a non-wireless connection to a data network, wherein the wireless configuration parameters allow the base station to communicate with the terminal, and wherein the tracking location ID is allocated by the network controller according to the signal measurement report, or the NRT is created by the network controller according to the signal measurement report.

21. The base station of claim 18, wherein the processor is further configured to receive an updated NRT from the network controller when another base station is added to the network.

22. A system, comprising:
a network controller responsible for mobility management of a terminal, wherein the network controller is configured to:
receive a registration request from a base station;
obtain wireless configuration parameters for the base station, wherein the wireless configuration parameters allow the base station to communicate with the terminal, and wherein the wireless configuration parameters comprise: a network identifier (ID) of a network to which the network controller belongs, a network name of the network, a base station ID of the base station, a base station cell ID of a cell that the network controller corresponding to the base station, a tracking location ID of the base station, and a neighbor relation table (NRT) comprising information of one or more neighbor cells of the cell corresponding to the base station;
send the wireless configuration parameters to the base station; and
receive a connection request from the base station; and
a base station coupled to the network controller and configured to:
send the registration request to the network controller;
receive wireless configuration parameters from the network controller;
broadcast the wireless configuration parameters to a plurality of terminals;
receive, via a wireless link, the connection request from one of the terminals according to the wireless configuration parameters of the base station, wherein the base station is in direct wireless communication with the terminal via the wireless link, wherein the wireless link is the only wireless portion of a communication path between the terminal and the network controller, wherein the base station has a non-wireless connection to a data network, and wherein the wireless link is the only wireless portion of a communication path between the terminal and the data network; and
send the connection request to the network controller.

23. The system of claim 22, wherein the base station is located between the network controller and the terminal, wherein the base station is an evolved node B (eNB) in a long term evolution (LTE) system, an access network (AN) in a fifth generation (5G) communication system, or a MulteFire-Access point (MF-AP) in a MulteFire network, wherein the base station is coupled to a session management entity via the network controller, wherein the session management entity is a session management function in a mobility management entity (MME) in the LTE system, a session management function (SMF) in the 5G system, or a session management function in a neutral host-MME (NH-MME) in the MulteFire network, wherein the base station is coupled to the data network via a user plane entity, and wherein the user plane entity is a serving gateway (SGW) and a packet data network gateway (PGW) in the LTE system, a user plane function (UPF) in the 5G system, or a neutral host-gateway (NH-GW) in the MulteFire network.

* * * * *

UNITED STATES PATENT AND TRADEMARK OFFICE
CERTIFICATE OF CORRECTION

PATENT NO. : 10,812,966 B2
APPLICATION NO. : 15/693498
DATED : October 20, 2020
INVENTOR(S) : Weisheng Jin It is certified that error appears in the above-identified patent and that said Letters Patent is hereby corrected as shown below:

On the Title Page

Page 2 item (56), 2nd Column, Line 21: "25A33, V13.3.0" should read "25.33, V13.3.0"

In the Claims

Claim 17, Column 21, Line 4: "station," should read "station;"

Signed and Sealed this
First Day of December, 2020

Andrei Iancu
*Director of the United States Patent and Trademark Office*